United States Patent [19]

Bishay et al.

[11] Patent Number: 5,536,514
[45] Date of Patent: Jul. 16, 1996

[54] CARBOHYDRATE/PROTEIN CREAM SUBSTITUTES

[75] Inventors: Ihab E. Bishay, Palatine; Deane R. Clark, Wheaton, both of Ill.

[73] Assignee: The NutraSweet Company, Deerfield, Ill.

[21] Appl. No.: 438,798

[22] Filed: May 11, 1995

[51] Int. Cl.⁶ .................................................. A23C 13/00
[52] U.S. Cl. .......................... 426/103; 426/601; 426/804
[58] Field of Search ................................... 426/103, 602, 426/804, 573, 576, 577

[56] References Cited

U.S. PATENT DOCUMENTS

| | | | |
|---|---|---|---|
| 4,021,582 | 5/1977 | Hsu | 426/99 |
| 4,305,964 | 12/1981 | Moran | 426/573 |
| 4,347,261 | 8/1982 | Challen | 426/573 |
| 4,515,769 | 5/1985 | Merritt | 426/103 |
| 4,734,287 | 3/1988 | Singer et al. | |
| 4,828,396 | 5/1989 | Singer et al. | |
| 4,855,156 | 8/1989 | Singer et al. | |
| 4,911,946 | 3/1990 | Singer et al. | |
| 4,923,981 | 5/1990 | Weibel | 426/602 |
| 4,961,953 | 10/1990 | Singer et al. | |
| 4,985,270 | 1/1991 | Singer et al. | |
| 5,011,701 | 4/1991 | Baer | 426/602 |
| 5,021,248 | 6/1991 | Stark | 426/96 |
| 5,080,921 | 1/1992 | Reimer | 426/804 |
| 5,096,730 | 3/1992 | Singer | 426/583 |
| 5,098,718 | 3/1992 | Ardaellon | 426/2 |
| 5,104,674 | 4/1992 | Chen | 426/602 |
| 5,112,626 | 5/1992 | Huang | 426/43 |
| 5,147,677 | 9/1992 | Ziegler | 426/804 |
| 5,153,020 | 10/1992 | Singer et al. | |
| 5,164,210 | 11/1992 | Campbell | 426/302 |
| 5,330,778 | 7/1994 | Stark | 426/804 |
| 5,413,804 | 5/1995 | Rhodes | 426/804 |
| 5,458,904 | 10/1995 | Zolper | 426/804 |
| 5,462,761 | 10/1995 | McGinley | 426/804 |

FOREIGN PATENT DOCUMENTS

WO91/04674  4/1991  WIPO .
WO91/19424  12/1991  WIPO .

*Primary Examiner*—Carolyn Paden
*Attorney, Agent, or Firm*—Marshall, O'Toole, Gerstein, Murray & Borun

[57] ABSTRACT

The invention provides improved cream substitutes of water dispersible macrocolloids comprising non-aggregated macrocolloidal particles comprising a carbohydrate core and a protein shell wherein the particles having a substantially spheroidal shape and a mean particle-size distribution ranging from about 0.1 microns to 4 microns, with less than 2% of the total number of particles exceeding 5 microns in diameter, the particles in a hydrated state effective to form a macrocolloid having the substantially smooth organoleptic character of an oil-in-water emulsion.

16 Claims, No Drawings

CARBOHYDRATE/PROTEIN CREAM SUBSTITUTES

BACKGROUND OF THE INVENTION

The present invention relates generally to non-fat and reduced-fat products which possess the organoleptic characteristics of full fat-containing products. More specifically, the invention relates to cream substitutes which comprise a core of carbohydrate surrounded by a shell of protein.

Singer et al., U.S. Pat. Nos. 4,734,287 and 4,961,953 disclose a proteinaceous, water-dispersible, macrocolloid comprising substantially non-aggregated particles of dairy whey protein and other proteins. The particles have mean diameter particle size distributions in a dried state ranging from about 0.1 microns to about 2.0 microns, with less than about 2 percent of the total number of particles exceeding 3.0 microns in diameter. Singer et al., U.S. Pat. No. 4,828,396 disclose fluid processing devices including means for generating toroidal flow in a fluid to be processed. The devices are capable of cooking under high shear rates and are useful for producing macrocolloids for use as fat substitutes.

Singer et al., U.S. Pat. No. 4,855,156 disclose non-fat and reduced fat whipped frozen desserts wherein part or all of the fat or oil ordinarily incorporated therein is replaced by a proteinaceous macrocolloid comprising denatured whey protein particles. Singer et al., U.S. Pat. No. 4,985,270 disclose non-fat and reduced fat whipped frozen dessert products wherein part or all of the fat or oil ordinarily incorporated therein are replaced by denatured whey protein particles or particles comprising a core of casein surrounded by a shell of denatured egg white protein. The patent further discloses the use of the composite egg white protein/casein particles as fat substitutes in sauces, dips, spreads, icing and cream pie fillings.

Carbohydrate-based fat substitutes have been proposed as low cost alternatives to the relatively expensive protein-based macrocolloid cream substitutes. Singer et al., U.S. Pat. Nos. 4,911,946 and 5,153,020, the disclosures of which are hereby incorporated by reference, disclose fat substitutes which comprise water-dispersible macrocolloidal particles composed of carbohydrate materials which particles have a substantially spheroidal shape and specific particle size distributions effective to impart the substantially smooth organoleptic character of an oil-in-water emulsion. These patents disclose carbohydrates that can attain a spheroidal or substantially round shape in the 0.1 to 5 micron diameter size range which are suitable for use as cream substitute ingredients. Starches which occur naturally as granules in this size range are suitable for use as cream substitutes and may be treated with cross linking agents to prevent excessive swelling beyond the desired size range. Carbohydrate materials which do not have a natural round shape can be treated by making a solution of the carbohydrate and converting the solution to a gel (typically in a field of high shear-force) so that a narrow distribution of gelled microparticles is formed.

Of interest to the present invention are the disclosures of Spiers et al. PCT Publication WO91/04674 and Spiers et al. PCT Publication WO 91/19424 which relate to alginate and pectin based fat substitutes. The WO 91/04674 publication discloses methods of forming alginate and pectin gels by forming an aqueous mixture of a water soluble or water dispersible alginate or pectin, a calcium ion sequestrant and a sparingly soluble calcium source at low temperature. The mixture is then heated to cause gelation thereof. The WO 91/19424 publication discloses the use of sequestered divalent metal ions such as calcium ions in the production of alginate and pectin microparticulate beads having a size range of from about 15–300 µm for use as fat substitutes. Such fat substitutes are not completely satisfactory because of their relatively large particle sizes, however. Moreover, carbohydrate-based cream substitutes are generally inferior to protein-based cream substitutes because they lack the superior functionality exhibited by proteins. Accordingly, there remains a desire in the art for improved carbohydrate containing fat substitutes which are characterized by the functionality of protein-based cream substitutes and methods for their production.

SUMMARY OF THE INVENTION

The present invention provides improved carbohydrate cream substitutes which are characterized by the functionality of protein-based cream substitutes. Also provided are methods for their production. Specifically, water dispersible macrocolloids are provided which are made up of substantially spheroidally shaped particles which may comprise a core of carbohydrate and a shell of protein. More specifically, the macrocolloids of the invention are made up of substantially non-aggregated macrocolloidal particles comprising a core of carbohydrate and a shell of protein wherein the particles have a substantially spheroidal shape and a mean particle-size distribution ranging from about 0.1 microns to 4 microns, with less than 2% of the total number of particles exceeding 5 microns in diameter. The particles are further characterized in that they are effective in a hydrated state to form a macrocolloid having the substantially smooth organoleptic character of an oil-in-water emulsion.

The invention also provides methods of producing the improved fat substitutes comprising forming particles of carbohydrate and coating those particles with a shell of protein such that the resulting particles are characterized by having a substantially spheroidal shape and a mean particle size distribution ranging from about 0.1 microns to 4 microns, with less than 2% of the total number of particles exceeding 5 microns in diameter. According to one method, the coating step is carded out by treating a mixture of protein and microparticulated carbohydrate having a pH greater than the isoelectric point of said protein with an acid to lower the pH of the mixture to below the isoelectric point of the protein, yet maintain the net negative charge of the carbohydrate. The protein molecules then adopt a positive charge and are attracted to the negatively charged carbohydrate particles with the result that the proteins form a coating on the carbohydrate core.

As yet another aspect of the invention, improved methods of preparing gum-based cream substitutes are provided which comprise the steps of (1) producing a solution of a gum; (2) combining protected ions, preferably sequestered calcium ions, with said solution; (3) placing said solution under high shear conditions; and (4) releasing said ions to form carbohydrate microparticles under said shear conditions which are selected to form substantially non-aggregated macrocolloidal particles of carbohydrate having a substantially spheroidal shape from about 0.1 to 4 microns, with less than 2% of the total number of particles exceeding 5 microns in diameter, the particles in a hydrated state being effective to form a macrocolloid having the substantially smooth organoleptic character of an oil-in-water emulsion.

Preferred gums are selected from the group consisting of alginate, gellan and pectin and the resulting carbohydrate particles can be coated with protein in order to produce the preferred carbohydrate/protein cream substitutes of the invention.

DETAILED DESCRIPTION OF THE INVENTION

The present invention provides improved carbohydrate cream substitutes and methods for the production of same. Specifically, the invention provides water dispersible macrocolloids comprising substantially spheroidally shaped particles which comprise a core of carbohydrate and a shell of protein which can be used as cream substitutes. The invention also provides improved methods of producing carbohydrate-based cream substitutes. The resulting cream substitutes are particularly useful for producing the core/shell macrocolloidal particles of the invention.

The particularly desired organoleptic qualities of the macrocolloid materials of the invention are particularly dependent upon the sizes and shapes of the macrocolloid particles. Specifically, it has been found that dispersions of particles with diameters greater than about 4 microns impart an undesirable chalky mouth feel. The shapes of particles are also important. Particles which are generally spheroidal tend to produce a smoother, more emulsion-like organoleptic sensation. Where increased proportions of macrocolloid particles are generally spheroidal or where the macrocolloid particles are more perfectly spheroidal, it may occur that somewhat greater proportions of particles may have diameters greater than about 4 microns without detriment to the organoleptic character of the macrocolloid mixture. Particle sizes of about 0.1 microns contribute a greasy mouth feel which may be objectionable if it is perceived as the dominant tactile characteristic.

According to the invention, cream substitutes are provided which comprise macrocolloidal particles comprising a core of carbohydrate surrounded by a shell of protein. Such macrocolloidal particles can be produced by formation of carbohydrate particles and subsequent enrobbing of those particles with a shell of protein.

According to methods wherein carbohydrate particles are formed and then later enrobbed with a protein coating, various known methods can be utilized to form carbohydrate particles of the appropriate generally spheroidal shape and appropriate size. Specifically, Singer et al., U.S. Pat. No. 5,153,020, the disclosure of which is hereby incorporated by reference, teaches various methods for the production of macrocolloidal carbohydrate particles. Such methods include selection of starches having granules of appropriate sizes and cross-linking of those granules to prevent excessive swelling upon hydration. Appropriate cross-linking methods are well known in the art and include treatment with cross-linking agents such as phosphates, phosphorus oxychloride and dicarboxylic anhydrides.

Methods of producing macrocolloidal carbohydrate particles from sources other than starch granules are also disclosed by Singer U.S. Pat. No. 5,153,020. Other suitable carbohydrates include gums such as algin, pectin and gellan, cross-linked dextran, curdlan, konjac, mannan, chitin, schizophyllan and chitosan. Carbohydrate gels that do not have a natural round shape must be treated so that they attain a substantially spheroidal shape. This can be accomplished by producing a solution of the carbohydrate and converting the solution to a gel rapidly and uniformly (typically in a field of high shear-force) so that a narrow distribution of gelled microparticles are formed having the above described diameters of between about 0.1 and 5 microns. The apparatus and high shear mixing methods described in Singer et al., U.S. Pat. No. 4,828,396, the disclosure of which is hereby incorporated by reference, are particularly useful for producing carbohydrate macrocolloid particles for use according to the invention. According to one method, a stream of carbohydrate solution is introduced into a highly turbulent reaction zone where the gelled microparticles are formed. According to another method, calcium alginate macrocolloidal particles are formed by making a solution of sodium alginate and introducing this solution into a calcium ion containing solution through, for example, an ultrasonic spray nozzle or other device capable of producing droplets less than 5 microns in diameter. Alternatively, a solution of sodium alginate can be introduced into the fluid processor apparatus described in Singer, U.S. Pat. No. 4,828,396 and subjected to sheafing during administration of a calcium chloride solution to form calcium alginate microparticles. As another example, gellan can be microparticulated by spray cooling a hot gellan solution by means of a device capable of producing droplets less than 5 microns in diameter.

The present invention also provides improved methods for the preparation of gum-based macrocolloidal particles which can be used as a carbohydrate core to be enveloped by a protein shell or can be used alone as a carbohydrate cream substitute. While gums such as alginate and pectin can be solubilized and treated by administration of calcium ions to form gels which are simultaneously or subsequently subjected to shear to form microparticles, the present invention provides improved methods for production of such microparticles. Specifically, methods for the production of gum-based cream substitutes are provided according to the steps of (1) producing a solution of the gum; (2) combining protected ions with said solution; (3) placing said solution under high shear conditions; and (4) releasing said ions under said shear conditions which are selected to form substantially non-aggregated macrocolloidal particles of gum. According to this method, the shear conditions are selected to form substantially non-aggregated macrocolloidal particles of gum having a substantially spheroidal shape and a mean particle-size distribution ranging from about 0.1 to 4 microns, with less than 2% of the total number of particles exceeding 5 microns in diameter, the particles in a hydrated state effective to form a macrocolloid having the substantially smooth organoleptic character of an oil-in-water emulsion.

According to the methods of the invention, an aqueous solution is prepared which contains up to 8% by weight of a gum, with or without other gums. The gum preferably comprises sodium alginate, pectin or gellan. The gum solution is then combined with protected ions, which can be calcium or other appropriate ions including but not limited to sodium, potassium, magnesium and the like. The ions may be protected by sequestration, encapsulation or other means known to those of skill in the art. Preferred ions for use according to the methods of the invention are calcium ions. Calcium ions, for example, may be sequestered either by means of a calcium salt which is insoluble (or has very low solubility) at the pH or temperature of the premix, by using a calcium ion sequestrant which can release the sequestered ion upon changing the pH, temperature, or by other methods known to the art. Calcium ions protected by encapsulation may be released by heating. Preferred calcium salts for sequestration of calcium ions include monocalcium phosphate, dicalcium phosphate, tricalcium phosphate, calcium tripolyphosphate, calcium carbonate, calcium caseinate and calcium citrate. Other ions, such as sodium, potassium, magnesium, and the like, may be protected by sequestration, encapsulation or by various methods known to those skilled in the art.

The concentration and nature of the ion used to form the gel can be varied in order to achieve the desired properties of the final microparticle. Depending on the source and type of polysaccharide, the gel microparticle can range in strength from a soft deformable gel to a hard brittle gel. An appropriate ion gelling gum and gel forming ion is thus chosen to achieve the desired properties of the final product.

The solution containing the gum and sequestered ions is then placed in a fluid processor device such as that described in Singer, U.S. Pat. No. 4,828,396. While the solution is undergoing shear, the ions are released to the gum to form microparticles of the geller gum either by acidification, heat or other appropriate means. It is postulated that the insoluble sequestered ions act as nuclei upon which the carbohydrate microparticles can form.

Once the carbohydrate macrocolloidal particles are formed, they must not substantially aggregate further and must preferably remain un-aggregated.

The resulting microparticulated cream substitute may then be used as a cream substitute alone or can be further treated with protein according to the methods of the invention to yield a carbohydrate core/protein shell cream substitute material. The cream substitute may also be dried by lyophilization, spray drying, drum drying or other suitable means. The resulting dried product can easily be reconstituted using conventional mixing equipment and will retain its functionality.

The invention provides methods by which particulated ionic polysaccharide materials such as alginates, pectins, gellan and the like can be combined with a protein such as whey, casein, soy, albumin and other soluble proteins to produce the carbohydrate core/protein shell macrocolloidal particles of the invention. The mixture is then titrated with acid to reach a pH at or below the isoelectric pH of the protein component, yet above the isoelectric pH of the carbohydrate component. This results in a reversal of the net charge on the protein, from negative to positive, while the carbohydrate component remains unaffected and maintains a net negative charge. The lowering of pH results in an ionic attraction of the protein to the particulated carbohydrate to form a complex comprising a carbohydrate core and a protein shell. Following this step, the pH may optionally be readjusted without disrupting the complex. If protein modification, such as denaturation, is desired, this can be carded out either prior to or after the complexation step. The resulting macrocolloidal particles can be used as cream substitutes in a variety of applications according to the invention.

The macrocolloids of the invention can replace all or a portion of the fat or cream in food products which typically comprise fat or oil. Specifically, the invention provides improvements in food products containing fat and/or cream, the improvement which comprises: substituting for all or a portion of the fat and/or cream, a water-dispersible macrocolloid comprising substantially non-aggregated macrocolloidal particles comprising a core comprising carbohydrate and a shell comprising protein, said particles having a substantially spheroidal shape and a mean particle-size distribution ranging from about 0.1 microns to 4 microns, with less than 2% of the total number of particles exceeding 5 microns in diameter, the particles in a hydrated state effective to form a macrocolloid having the substantially smooth organoleptic character of an oil-in-water emulsion. The macrocolloid cream substitutes of the invention typically contain from about 1 to about 20 percent by weight carbohydrate, depending upon the water binding capacity of the specific carbohydrate. Such food products as ice cream, yogurt, pourable and spoonable salad dressings, mayonnaise, cream, cream cheese, natural cheese, other cheeses, sour cream, sauces, dips, icings, whipped toppings, frozen confections, milk, coffee whitener and spreads may be formulated as reduced fat products, benefiting from the hydrated macrocolloid replacing all or part of the fat and still providing the desired creaminess.

EXAMPLE 1

In this example, an alginate cream substitute was produced according to an improved method of the invention. Specifically, an aqueous solution containing 2% by weight sodium alginate (Kelgin LV, Kelco Division of Merck, San Diego Calif.) was prepared and anhydrous dicalcium phosphate (Stauffer Chemical Co., Westport, Conn.) was mixed in to the alginate solution to reach a final concentration of 0.15 M. Since dicalcium phosphate is insoluble in water at neutral pH or higher, it forms a dispersion and does not interact with the sodium alginate to any significant extent. The mixture, at pH 8.0, was then placed into a fluid processor device such as that described in Singer, U.S. Pat. No. 4,828,396 which had been modified in order to allow a syringe to inject solutions into the reservoir. While the processor device was subjecting the solution to shear at 5200 rpm, 1 N HCl was injected in order to lower the pH to 4.7. This caused the dicalcium phosphate to be solubilized and thus interact with the sodium alginate to form calcium alginate microparticulated gel. At this point, a concentrated solution of calcium chloride (for example 6 mol/l) was optionally added to the mixture while still under the high shear environment to further adjust the texture of the particles once they had been formed. After injection of the calcium chloride, the final calcium chloride concentration was 0.045 M. The excess dicalcium phosphate in the final product was removed by treating the solution with a pH 4.5 buffer to solubilize the dicalcium phosphate and then removing the liquid phase by high speed centrifugation at 22,100 X G (Beckman Model J2-21 Centrifuge, Beckman Instruments, Inc. Palo Alto, Calif.). The particles which resulted from this process were spheroidal, between 0.1 and 3 microns in diameter, deformable and exhibited few or weak particle to particle interactions, as determined by rheological measurements. The product was smooth and creamy with no associated chalkiness or grittiness. These particles could be used as a carbohydrate cream substitute alone or could be subjected to further processing to produce the carbohydrate core/protein shell macrocolloid particles of the invention.

EXAMPLE 2

In this example, an alginate cream substitute was prepared according to an improved method of the invention. Specifically, a solution of calcium chloride was mixed with trisodium phosphate so that the concentration of each component was 0.3 M. The trisodium phosphate acts as sequestering agent for the calcium ions. To this mixture, sodium alginate (Protanal LF 40, Pronova Inc., Portsmouth, N.H.) was added to a final alginate concentration of 2% by weight. This mixture was then placed into a fluid processor device such as that described in Singer, U.S. Pat. No. 4,828,396 which had been modified according to Example 1 above. While the processor device was subjecting the solution to shear at 5200 rpm, 12 N HCl was injected in order to lower the pH to 5.7 and cause the sequestrant to release the calcium ions and thus initiate the formation of calcium alginate microparticulated gel. The remaining sequestrant and other low molecular weight components were removed by diafiltration using an ultrafiltration unit equipped with 100,000 molecular weight cutoff polysulfone membrane (DDS Mini-Lab 10, DDS Filtration, Nakskov, Denmark). The particles which resulted from this process were spheroidal, between 0.1 and 3 microns in diameter, deformable and exhibited few or weak particle to particle interactions as determined by rheological measurements. Organoleptically this product exhibited a smooth, creamy mouthfeel, where no individual particles can be felt by the tongue. These particles could be used as a carbohydrate cream substitute alone or could be subjected to further processing to produce the carbohydrate core/protein shell macrocolloid particles of the invention.

EXAMPLE 3

In this example, an alginate cream substitute was prepared according to an improved method of the invention. Specifically, a solution of calcium chloride was mixed with sodium carbonate so that the concentration of each component was 0.21 M. To this mixture, sodium alginate (Protanal LF 5/40 RB, Pronova Inc., Portsmouth, N.H.) was added to a final alginate concentration of 5% by weight. This mixture was then placed into a fluid processor device such as that described in Singer, U.S. Pat. No. 4,828,396 which had been modified according to Example 1 above. While the processor device was subjecting the solution to shear at 5200 rpm, 6 N HCl was injected in order to lower the pH to 6.1 and cause the sequestrant to release the calcium ions and thus initiate the formation of calcium alginate microparticulated gel. The remaining sequestrant and other low molecular weight components were removed by diafiltration using an ultrafiltration unit equipped with 100,000 molecular weight cutoff polysulfone membrane (DDS Mini-Lab 10, DDS Filtration, Nakskov, Denmark). The final product was made up of individual calcium alginate particles between 0.2 and 2.5 microns, with an average particle size of 0.8 microns. This product has a clean flavor with a smooth, creamy texture. This material was dried and subsequently rehydrated, resulting in the same particle size distribution and functionality as before drying. These particles could be used as a carbohydrate cream substitute alone or could be subjected to further processing to produce the carbohydrate core/protein shell macrocolloid particles of the invention.

EXAMPLE 4

In this example, a pectin cream substitute was prepared according to an improved method of the invention. Specifically, a solution of calcium chloride was mixed with sodium carbonate so that the concentration of each component was 0.21 M. To this mixture, pectin (OM-601 Herbstreith & Fox, Neuenburg/Wurtt, Germany) was added to a final concentration of 2% by weight. This mixture was then placed in a fluid processor device such as that described in Singer, U.S. Pat. No. 4,828,396 which had been modified according to Example 1 above. While the processor device was subjecting the solution to shear at 5200 rpm, 6 N HCl was injected in order to lower the pH to 6.1 and cause the sequestrant to release the calcium ions and thus initiate the formation of calcium pectate microparticulated gel. The remaining sequestrant and other low molecular weight components were removed by diafiltration using an ultrafiltration unit equipped with 100,000 molecular weight cutoff polysulfone membrane (DDS Mini-Lab 10, DDS Filtration, Nakskov, Denmark). The average particle size of this product was 1.2 microns. This product had a smooth, creamy mouthfeel, with little or no grittiness. These particles could be used as a carbohydrate cream substitute alone or could be subjected to further processing to produce the carbohydrate core/protein shell macrocolloid particles of the invention.

EXAMPLE 5

According to this example, microparticulated calcium alginate was coated with whey protein to produce a carbohydrate core/protein shell macrocolloid according to the invention. Specifically, a 7:3 volume fraction of microparticulated calcium alginate produced generally according to the method of Example 3 and liquid whey protein concentrate was made by adding 9.5 Kg of liquid whey protein concentrate (42% solids; 53% protein, dry basis) to 22.2 Kg of the microparticulated calcium alginate (2% solids). The mixture, which had a pH of 6.33 at mixing, was treated with 1 N HCl to lower its pH to 4.23 which was below the isoelectric pH of the whey protein. The lowering of pH reversed the net negative charge on the whey protein to a net positive charge with the result that the whey proteins were attracted to the negatively charged microparticulated calcium alginate particles forming a protein coating on those particles. The mixture was then treated with 1 N NaOH to raise the pH to 6.53 and the mixture was then heated to 95° C. in order to denature the whey protein shells. The final product had the mouthfeel and flavor profile similar to Simplesse® 100, an all whey protein fat substitute disclosed in U.S. Pat. Nos. 4,734,287 and 4,961,953. Transmission Electron Microscopy revealed the presence of microparticles comprising carbohydrate and protein less than one micron in diameter but did not indicate the presence of any microparticles comprising only protein. Zeta potential measurements, probing the particle surface, indicate that the carbohydrate cores are enrobbed by the protein shell. This material was dried and subsequently rehydrated, resulting in the same particle size distribution and functionality as before drying.

Numerous modifications and variations in the practice of the invention are expected to occur to those skilled in the art upon consideration of the foregoing description of the presently preferred embodiments thereof. Consequently, the only limitations which should be placed upon the scope of the present invention are those which appear in the appended claims.

What is claimed:

1. A water dispersible macrocolloid comprising substantially non-aggregated macrocolloidal particles comprising a core of carbohydrate and a shell comprising protein, said particles having a substantially spheroidal shape and a mean particle-size distribution ranging from about 0.1 microns to 4 microns, with less than 2% of the total number of particles exceeding 5 microns in diameter, the particles in a hydrated state effective to form a macrocolloid having the substantially smooth organoleptic character of an oil-in-water emulsion.

2. The water dispersible macrocolloid of claim 1 wherein said carbohydrate comprises a gum selected from the group consisting of alginate, pectin and gellan.

3. The water dispersible macrocolloid of claim 1 wherein said protein is selected from the group consisting of whey, casein, soy, albumin and other soluble proteins.

4. The water dispersible macrocolloid of claim 1 wherein said macrocolloid can be dried and rehydrated while maintaining its particle size distribution and functionality.

5. In a food product normally containing fat and/or cream, the improvement which comprises: substituting for all or a portion of the fat and/or cream, a water-dispersible macrocolloid comprising substantially non-aggregated macrocolloidal particles comprising a core comprising carbohydrate and a shell comprising protein, said particles having a substantially spheroidal shape and a mean particle-size distribution ranging from about 0.1 microns to 4 microns, with less than 2% of the total number of particles exceeding 5 microns in diameter, the particles in a hydrated state effective to form a macrocolloid having the substantially smooth organoleptic character of an oil-in-water emulsion.

6. A method of producing a water dispersible macrocolloid comprising substantially non-aggregated macrocolloidal particles comprising a core of carbohydrate and a shell of protein, said particles having a substantially spheroidal shape and a mean particle-size distribution ranging from about 0.1 microns to 4 microns, with less than 2% of the total number of particles exceeding 5 microns in diameter, the particles in a hydrated state effective to form a macrocolloid having the substantially smooth organoleptic character of an oil-in-water emulsion, said method comprising the steps of:

(a) forming microparticles of carbohydrate; and (b) coating said carbohydrate microparticles with shells comprising protein.

7. The method of claim 6 wherein said coating step is carried out by treating a mixture of protein and microparticulated carbohydrate having a pH greater than the isoelectric point of said protein with an acid to lower the pH of said mixture to below the isoelectric point of said protein and above the isoelectric pH of the said carbohydrate such that said protein forms a shell on said microparticles.

8. The method of claim 6 wherein said carbohydrate comprises a gum selected from the group consisting of alginate, pectin and gellan.

9. The method of claim 6 wherein said protein is selected from the group consisting of whey, casein, soy, albumin and other soluble proteins.

10. An improved method for preparation of a gum-based cream substitute comprising the steps of (1) producing a solution of a gum; (2) combining protected ions with said solution; (3) placing said solution under high shear conditions; and (4) releasing said ions to form gum microparticles under said shear conditions which are selected to form substantially non-aggregated macrocolloidal particles of gum having a substantially spheroidal shape and a mean particle-size distribution ranging from about 0.1 to 4 microns, with less than 2% of the total number of particles exceeding 5 microns in diameter, the particles in a hydrated state effective to form a macrocolloid having the substantially smooth organoleptic character of an oil in-water emulsion.

11. The method of claim 10 wherein the product may be dried and rehydrated while retaining their particle size distribution and functionality.

12. The method of claim 10 wherein said gum is selected from the group consisting of alginate, pectin and gellan.

13. The method of claim 10 wherein said ions are released from sequestration by acidifying or heating said gum solution.

14. The method of claim 10 wherein said ions are calcium ions.

15. The method of claim 14 wherein said calcium ions are chemically sequestered.

16. The method of claim 15 wherein said sequestered calcium ions are selected from the group consisting of monocalcium phosphate, dicalcium phosphate, tricalcium phosphate, calcium tripolyphosphate, calcium carbonate, calcium caseinate and calcium citrate.

* * * * *